No. 693,453. Patented Feb. 18, 1902.
W. L. SILVEY.
SECONDARY BATTERY PLATE.
(Application filed Jan. 10, 1901.)
(No Model.)
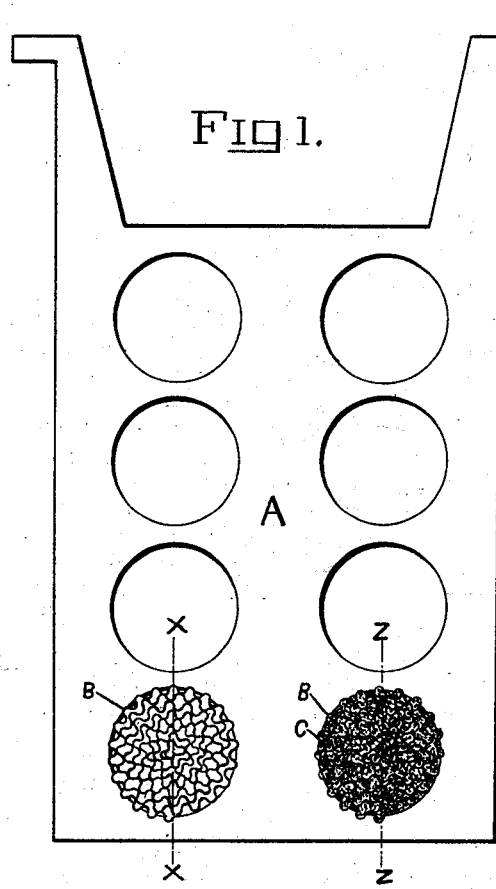
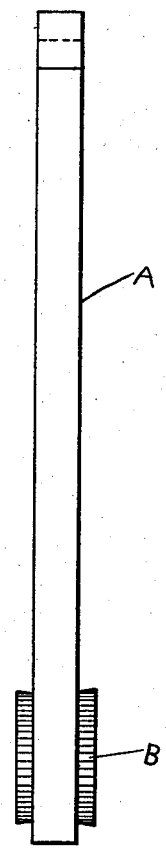
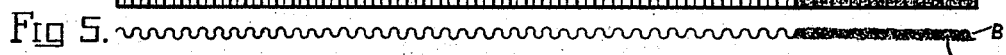
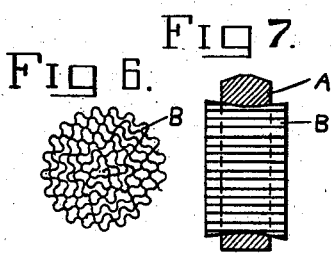
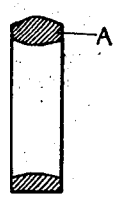
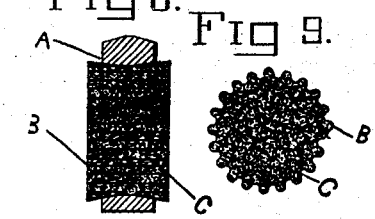
Attest.
Frank Buchanan.
J. Kirby Jr.
Inventor.
William L. Silvey

UNITED STATES PATENT OFFICE.

WILLIAM L. SILVEY, OF DAYTON, OHIO.

SECONDARY-BATTERY PLATE.

SPECIFICATION forming part of Letters Patent No. 693,453, dated February 18, 1902.

Application filed January 10, 1901. Serial No. 42,759. (No model.)

*To all whom it may concern:*

Be it known that I, WILLIAM L. SILVEY, a citizen of the United States, residing at No. 848 East May street, in the city of Dayton, county of Montgomery, and State of Ohio, have invented certain new and useful Improvements in Secondary-Battery Plates; and I do hereby declare the following to be a full, clear, and exact description of the invention, such as will enable others skilled in the art to which it appertains to make and use the same.

My invention relates to electrodes for secondary batteries and to that class of electrodes comprising crimped or corrugated strips formed into coiled plugs and fixed in holes in a coil-sustaining plate or frame by upsetting their ends. Its object is to produce an efficient and durable electrode, and more particularly to produce coiled plugs formed of strips having receptacles of uniform and equal width and depth filled with an adherent active material ready for subsequent use in the electrolyte of battery-cells.

Referring to the accompanying drawings, which are made a part hereof, in which similar letters refer to similar parts, Figure 1 is a front of a side elevation of a battery-plate A with two perforations or holes in it filled with conductive and active elements. Fig. 2 is an edge view of a plate. Fig. 3 is a broken or cross section of Fig. 1 along the dotted line X X, but with the conductor B removed. Fig. 4 is a corrugated conductor-strip B, a filling C being illustrated, for convenience, as applied to only a part of the strip. Fig. 5 is an edge view of the strip and filling shown in Fig. 4. Fig. 6 is a conductor-strip B rolled up ready to be inserted in the plate A. Fig. 7 is a section of the plate A and conductor-strip B in position along the dotted line X X of Fig. 1. Fig. 8 is a section of the battery-plate A with conductor-strip B and filling C in position along the dotted line Z Z of Fig. 1. Fig. 9 is an end view of a rolled-up conductor-strip B, Fig. 6, filled with finely-divided lead compound C.

It will be observed that I have only shown enough holes in the battery-plate A to illustrate my construction. In practice there may be from four up to several hundred, according to the size of the plate. I have found it a good practice to taper these holes to the center from each side and after inserting the conductor B in place to upset it, as shown in Figs. 2, 7, and 8, by means of which a more perfect electrical contact is maintained and the plugs are also firmly keyed into position. This upsetting is confined to the outer convolutions of the coiled plug to avoid disturbing the equal and uniform distribution of the active filling material. These plugs are made to project beyond the surface of the plate, so that electrical action during the charging and discharging is confined almost entirely to the plugs, and but little galvanic action takes place on the plate A, which is of very great value in maintenance, as the plate is made to have a very long life. In practice I construct the conductor-strips by slotting thin sheet-lead into strips about the width and thickness as shown in the drawings. It is now corrugated, so as to present a uniform cross-section, the corrugations being uniform in size and elevation. This provides for the easy introduction of the active material and for its even and uniform distribution. In some cases I spread these corrugated strips with a compound of lead made into a paste, so as to fill up the corrugations, as shown at one end of Figs. 4 and 5. I then roll the corrugated and filled strip into a button. The button is then inserted into the plate A, as shown in Fig. 8. The filling for the plugs is composed of a mixture of metallic lead particles and oxid of lead made into a paste with water or a mixture of water and an acid. The strips B after being combined with the filling C are next pickled in a solution of acid and water to harden the filling and make it more adherent and at the same time sulfate the filling, changing the metallic lead into sulfate of lead and also acting on any oxids that may be present. This to a large extent prevents expansion during subsequent galvanic action. It is evident that the active filling C may be applied in a dry powdered state by pressing it into the sheet by hydraulic power or otherwise. The fixing and pickling are done before the plugs are inserted in the hole, at which time the filling is hard and adherent and ready to undergo the forming process.

I do not confine myself to any particular proportion of mixture of acid and water.

What I claim as new, and wish to secure by Letters Patent of the United States, is—

1. In a storage battery, the combination of a corrugated conducting-strip with an external covering for the strip of a mixture of oxid of lead, powdered metallic lead and a liquid, said covering for the strip filling the grooves between the corrugations and presenting practically uniform parallel sides, the strip thus made being wound into a spiral plug and inserted into a conductor-plate, as set forth.

2. In a storage battery, the combination of a corrugated conducting-strip with an external covering for the strip of a mixture of oxid of lead, powdered metallic lead and a liquid, said covering for the strip filling the grooves between the corrugations and presenting practically uniform parallel sides, the strip thus made being wound into a spiral plug and inserted into a conductor-plate, said filled plugs projecting beyond the faces of the plate, as set forth.

3. In a storage battery, the combination of a corrugated conducting-strip with an external covering for the strip of a mixture of oxid of lead, powdered metallic lead and a liquid, said covering for the strip filling the grooves between the corrugations and presenting practically uniform parallel sides, the strip thus made being wound into a spiral plug, pickled, and subsequently inserted into a conductor-plate, as set forth.

4. The combination of a battery-plate having holes therein, a corrugated strip having its corrugations filled with active material whereby the filled strip has a practically uniform thickness, said filled strip being subsequently wound into a spiral to form a button and inserted in the plate.

5. In a storage battery, the combination of a corrugated conducting-strip with an external covering for the strip of a mixture of oxid of lead and powdered metallic lead, said covering filling the grooves between the corrugations and presenting practically uniform parallel sides, the strip thus made being wound into a spiral plug, pickled, and subsequently inserted into a conductor-plate, as set forth.

In testimony whereof I have set my hand in the presence of two subscribing witnesses.

WILLIAM L. SILVEY.

Witnesses:
EARL LONES,
D. P. HAMER.